United States Patent
Fukuda et al.

(10) Patent No.: US 10,057,619 B2
(45) Date of Patent: Aug. 21, 2018

(54) REMOTE CONTROL SYSTEM AND ELECTRONIC DEVICE

(71) Applicant: Panasonic Intellectual Property Management Co., Ltd., Osaka (JP)

(72) Inventors: Hideki Fukuda, Nara (JP); Masahiro Muikaichi, Osaka (JP); Osamu Kando, Osaka (JP); Shiro Iwasaki, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 15/555,562

(22) PCT Filed: Mar. 16, 2016

(86) PCT No.: PCT/JP2016/001497
§ 371 (c)(1),
(2) Date: Sep. 5, 2017

(87) PCT Pub. No.: WO2016/157783
PCT Pub. Date: Oct. 6, 2016

(65) Prior Publication Data
US 2018/0054642 A1    Feb. 22, 2018

(30) Foreign Application Priority Data

Mar. 27, 2015 (JP) ................. 2015-067432

(51) Int. Cl.
*H04N 5/44* (2011.01)
*H04N 21/41* (2011.01)

(52) U.S. Cl.
CPC ............. *H04N 21/41* (2013.01); *H04N 5/44* (2013.01); *H04N 21/4131* (2013.01)

(58) Field of Classification Search
CPC ...... H04N 5/44; H04N 21/478; H04N 21/422; H04N 21/41; H04N 21/4131

(Continued)

(56) References Cited

U.S. PATENT DOCUMENTS

| 8,531,395 B2* | 9/2013 | Sawai .................. G06F 3/0346 345/156 |
| 8,826,341 B2* | 9/2014 | Jung .................... H04N 5/4403 345/156 |

(Continued)

FOREIGN PATENT DOCUMENTS

| CN | 103376919 A | 10/2013 |
| EP | 2667627 A2 | 11/2013 |
| JP | 4843703 B | 12/2011 |

OTHER PUBLICATIONS

International Search Report of PCT application No. PCT/JP2016/001497 dated Jun. 7, 2016.

(Continued)

*Primary Examiner* — Trang U Tran
(74) *Attorney, Agent, or Firm* — McDermott Will & Emery LLP

(57) ABSTRACT

A remote control system includes a main body apparatus and a remote controller. A motion sensor included in the remote controller detects an amount of change in posture of the remote controller. A user interface creator included in the main body apparatus creates a user interface image including a pointer. The user interface creator: determines virtual coordinates of the pointer based on the amount of change in posture; when the virtual coordinates of the pointer are present in a movable region, displays the pointer at a position of the virtual coordinates; when the virtual coordinates of the pointer are present outside the movable region, displays the pointer at a position in the movable region closest to the virtual coordinates; and when the virtual coordinates of the pointer have reached a boundary of a clip region, limits the virtual coordinates of the pointer within the clip region.

8 Claims, 9 Drawing Sheets

(58) Field of Classification Search
USPC ....... 348/734, 563–564, 699; 725/37, 38, 52
See application file for complete search history.

(56) References Cited

U.S. PATENT DOCUMENTS

| | | | |
|---|---|---|---|
| 9,100,614 B2* | 8/2015 | Minnick | G06F 3/0485 |
| 9,390,714 B2* | 7/2016 | Kim | G10L 15/24 |
| 9,852,764 B2* | 12/2017 | Segal | H04N 5/2222 |
| 2010/0265175 A1 | 10/2010 | Kabasawa et al. | |

OTHER PUBLICATIONS

The Extended European Search Report dated Feb. 1, 2018 for the related European Patent Application No. 16771677.8.

* cited by examiner

REMOTE CONTROL SYSTEM AND ELECTRONIC DEVICE

This application is a U.S. national stage application of the PCT International Application No. PCT/JP2016/001497 filed on Mar. 16, 2016, which claims the benefit of foreign priority of Japanese patent application No. 2015-067432 filed on Mar. 27, 2015, the contents all of which are incorporated herein by reference.

TECHNICAL FIELD

The present disclosure relates to a remote control system including a main body apparatus and a remote controller, and an electronic device.

BACKGROUND ART

There is an electronic device in which a user can remotely control a main body apparatus using a remote controller. Such electronic devices include, for example, a television receiver and a recording and playback apparatus.

A recording and playback apparatus that records and plays back broadcast programs and includes a storage apparatus with increased capacity can record a significant number of programs. For example, a recording and playback apparatus disclosed in Patent Literature 1 includes a plurality of tuners and can simultaneously receive a plurality of channels, and is capable of continuously recording programs of one or more channels. Such a function is hereinafter referred to as "channel recording".

In addition, there is a remote control system that includes a remote controller having a motion sensor such as a gyro sensor mounted on the remote controller and that presents a user with a user interface image including a pointer that moves according to motion of the remote controller, so as to enable the user to intuitively operate an electronic device. The user that uses an electronic device having the remote control system mounted on the electronic device can operate the electronic device by, for example, selecting a button region on the user interface image by a pointer. Such a user operation is hereinafter referred to as a "motion operation".

CITATION LIST

Patent Literature

PTL 1: Japanese Patent No. 4,843,703

SUMMARY

When the user performs a motion operation, the pointer may move by slight motion of the remote controller and accordingly the user may not be able to perform an operation as intended by him/her.

In addition, when the user performs a motion operation, a reference position of the pointer may be shifted due to motion sensor error and accordingly the user may not be able to perform an operation as intended by him/her.

The present disclosure provides a remote control system which presents a user with a user interface image including a pointer that moves according to motion of a remote controller, and in which movement of the pointer against user's intentions is less likely to occur.

A remote control system of the present disclosure includes a main body apparatus and a remote controller. The remote controller includes a motion sensor and a transmitter. The motion sensor detects an amount of change in posture of the remote controller. The transmitter transmits a control signal including the amount of change in posture to the main body apparatus. The main body apparatus includes a receiver, a user interface creator, and a controller. The receiver receives the control signal transmitted from the remote controller. The user interface creator creates a user interface image including a pointer having a position that changes based on the amount of change in posture. The controller controls operation of the main body apparatus, according to the control signal. The user interface creator determines virtual coordinates of the pointer in a virtual plane including the user interface image, based on the amount of change in posture. In addition, when the virtual coordinates of the pointer are present in a movable region in the virtual plane, the user interface creator displays the pointer at a position of the virtual coordinates, the movable region being a smaller region than the user interface image. In addition, when the virtual coordinates of the pointer are present outside the movable region in the virtual plane, the user interface creator displays the pointer at a position in the movable region closest to the virtual coordinates. Then, when the virtual coordinates of the pointer have reached a boundary of a clip region in the virtual plane, the user interface creator limits the virtual coordinates within the clip region, the clip region being a larger region than the movable region.

An electronic device of the present disclosure includes a user interface creator that creates a user interface image including a pointer having a position that changes based on an input signal. The user interface creator determines virtual coordinates of the pointer in a virtual plane including the user interface image, based on the input signal. In addition, when the virtual coordinates of the pointer are present in a movable region in the virtual plane, the user interface creator displays the pointer at a position of the virtual coordinates, the movable region being a smaller region than the user interface image. In addition, when the virtual coordinates of the pointer are present outside the movable region in the virtual plane, the user interface creator displays the pointer at a position in the movable region closest to the virtual coordinates. Then, when the virtual coordinates of the pointer have reached a boundary of a clip region in the virtual plane, the user interface creator limits the virtual coordinates within the clip region, the clip region being a larger region than the movable region.

The remote control system of the present disclosure can make movement of the pointer against user's intentions less likely to occur.

DESCRIPTION OF EMBODIMENTS

Exemplary embodiments will be described in detail below with reference to the drawings as appropriate. Note, however, that a more-than-necessary detailed description may be omitted. For example, a detailed description of already well-known matters and a duplicating description of substantially the same configurations may be omitted to avoid the following description from becoming unnecessarily redundant and facilitate the understanding of one skilled in the art.

Note that the accompanying drawings and the following description are provided for one skilled in the art to thoroughly understand the present disclosure and thus are not intended to limit the subject matter described in the claims.

Note also that the respective drawings are schematic diagrams and are not always depicted strictly. In addition, in the respective drawings, substantially the same components are denoted by the same reference mark and description thereof may be omitted or simplified.

First Exemplary Embodiment

With reference to FIGS. 1 to 12, a recording and playback apparatus of a first exemplary embodiment will be described below. Note that, in the following, switches that are provided to remote controller 2 and operable by a user are referred to as "keys". Note also that regions or areas that are displayed on screen 40 of display 4 and operable by the user are referred to as "button regions".

[1-1. Configuration]

Figure 1:
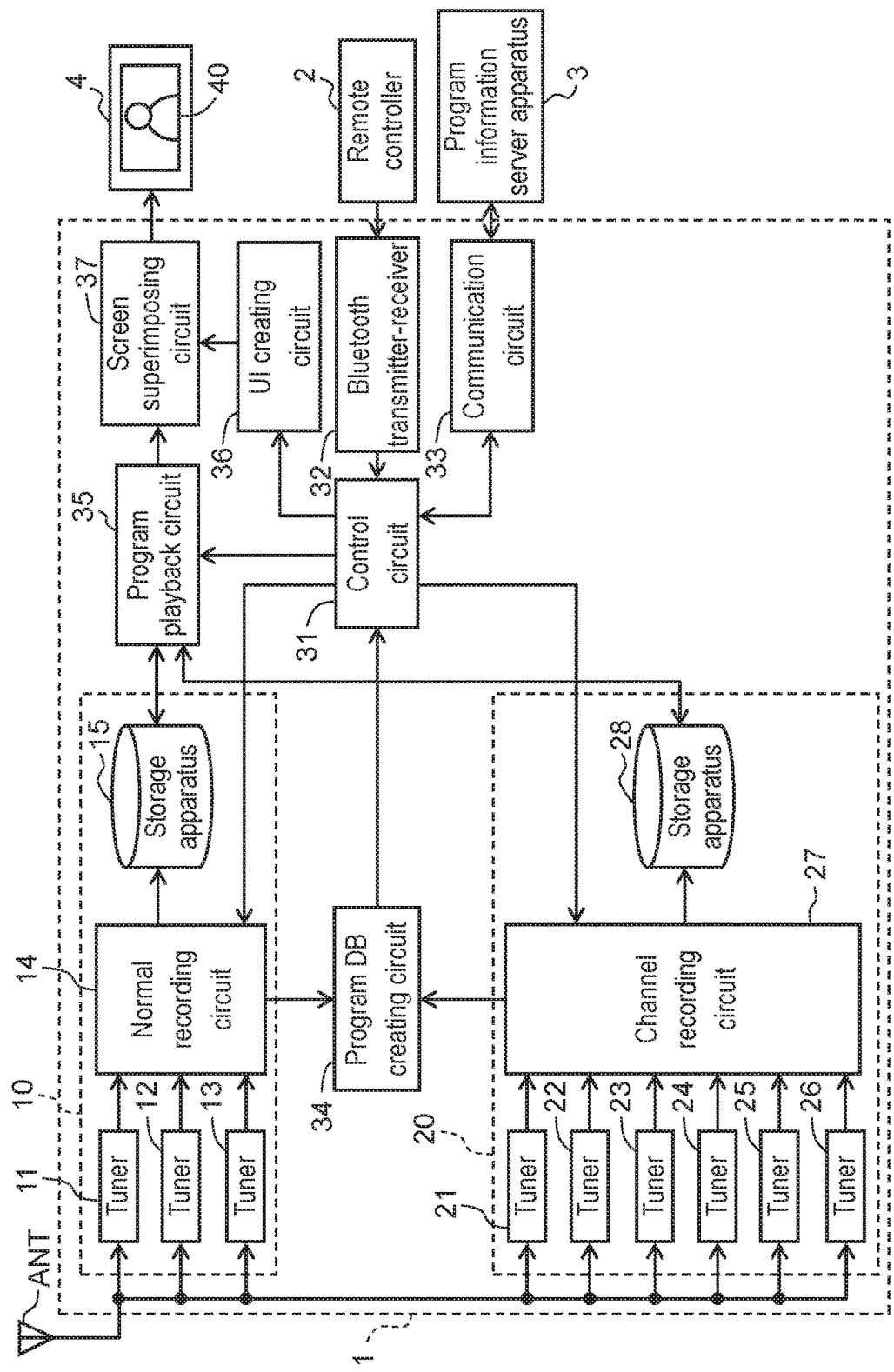
FIG. 1 is a block diagram schematically showing an exemplary configuration of a television system including a recording and playback apparatus of a first exemplary embodiment.

FIG. 1 is a block diagram schematically showing an exemplary configuration of a television system including a recording and playback apparatus of the first exemplary embodiment.

The television system includes antenna ANT, a recording and playback apparatus, program information server apparatus 3, and display 4. The recording and playback apparatus includes main body apparatus 1 and remote controller 2.

Main body apparatus 1 is connected to antenna ANT. Main body apparatus 1 can record a plurality of programs which are broadcast from broadcast stations through broadcast waves, and play back the recorded programs. Main body apparatus 1 has a normal recording function and a channel recording function. The normal recording function is a function of recording a program being broadcast which is specified by a user or a program that is programmed to record by the user. The channel recording function is a function of continuously recording programs of one or more channels. Therefore, main body apparatus 1 having the channel recording function can continuously record substantially all programs that are broadcast on channels which are recording targets.

Note that FIG. 1 only shows components related to the present exemplary embodiment among a plurality of components included in main body apparatus 1, and omits other components. The other components include components (e.g., a power supply circuit) that are commonly included in a recording and playback apparatus, but description of the other components is omitted.

Remote controller 2 can communicate with main body apparatus 1 wirelessly (e.g., Bluetooth (registered trademark)). Remote controller 2 obtains an instruction (user command) which is input by the user, and can wirelessly transmit the user command to main body apparatus 1.

Program information server apparatus 3 can communicate with main body apparatus 1 through a network such as the Internet, and provide main body apparatus 1 with information related to a program being played back on main body apparatus 1.

Display 4 is, for example, a television receiver. Display 4 is connected to main body apparatus 1 through an interface such as HDMI (High Definition Multimedia Interface) (registered trademark), and can display a program played back on main body apparatus 1, on screen 40.

Remote controller 2 includes a motion sensor, and can detect an amount of change in posture (difference in motion) of remote controller 2 for when remote controller 2 is shaken up and down or left and right. Remote controller 2 transmits a control signal including the detected amount of change in posture, to main body apparatus 1. Main body apparatus 1 moves a pointer on screen 40 of display 4, according to the amount of change in posture transmitted from remote controller 2.

Main body apparatus 1 of the recording and playback apparatus includes normal recorder 10, channel recorder 20, control circuit 31, Bluetooth transmitter-receiver 32, communication circuit 33, program DB (database) creating circuit 34, program playback circuit 35, UI (user interface) creating circuit 36, and screen superimposing circuit 37.

Normal recorder 10 includes tuner 11, tuner 12, tuner 13, normal recording circuit 14, and storage apparatus 15.

Channel recorder 20 includes tuner 21, tuner 22, tuner 23, tuner 24, tuner 25, tuner 26, channel recording circuit 27, and storage apparatus 28.

Normal recorder 10 can record a program being broadcast which is specified by the user or a program that is programmed to record by the user.

Channel recorder 20 can continuously record programs of one or more channels. Therefore, channel recorder 20 can continuously record substantially all programs that are broadcast on channels which are recording targets.

Tuners 11 to 13 and tuners 21 to 26 are examples of at least one receiver. Tuners 11 to 13 and tuners 21 to 26 are connected to antenna ANT, and can receive a plurality of programs that are broadcast from broadcast stations by terrestrial broadcasting or satellite broadcasting (BS (Broadcasting Satellite) broadcasting, CS (Communications Satellite) broadcasting, or the like).

Normal recording circuit 14 records a plurality of programs received by tuners 11 to 13, in storage apparatus 15. Channel recording circuit 27 records a plurality of programs received by tuners 21 to 26, in storage apparatus 28. Storage apparatus 15 and storage apparatus 28 are examples of a storage unit and may be composed of one or a plurality of hard disk drives, etc.

Channel recorder 20 may, for example, become inactive for a period of a predetermined length of a day for maintenance of main body apparatus 1 of the recording and playback apparatus.

Bluetooth transmitter-receiver 32 is an example of a receiver. Bluetooth transmitter-receiver 32 can receive a user command (control signal) from remote controller 2 by wirelessly communicating with remote controller 2.

Communication circuit 33 can obtain information related to a program being played back on main body apparatus 1 from program information server apparatus 3 by communicating with program information server apparatus 3. The information related to a program being played back on main body apparatus 1 includes, for example, a list of scenes of the program being played back, programs similar to the program being played back, and program ranking. Communication circuit 33 may obtain other information such as news by communicating with program information server apparatus 3.

Program DB creating circuit 34 can create a program database including attribute information, such as title names, recording time, and genres, and information about recording positions, of the programs recorded in storage apparatuses 15, 28.

Program playback circuit 35 is an example of a playback unit. Program playback circuit 35 can play back one of the plurality of programs recorded in storage apparatuses 15, 28.

UI creating circuit 36 is an example of a user interface creator. UI creating circuit 36 can create a plurality of user interface images, based on program database information. A user interface image is an image displayed on screen 40 of display 4 so that the user can select one of the plurality of programs recorded in storage apparatuses 15, 28.

Screen superimposing circuit 37 is an example of a screen superimposer. Screen superimposing circuit 37 can generate an output video signal, based on a video signal of a program played back and a user interface image.

Control circuit 31 is an example of a controller. Control circuit 31 can control operation of main body apparatus 1 (i.e., normal recording circuit 14, channel recording circuit 27, program playback circuit 35, and UI creating circuit 36), based on user commands.

Video created by the output video signal generated by screen superimposing circuit 37 is displayed on screen 40 of display 4.

Figure 2:
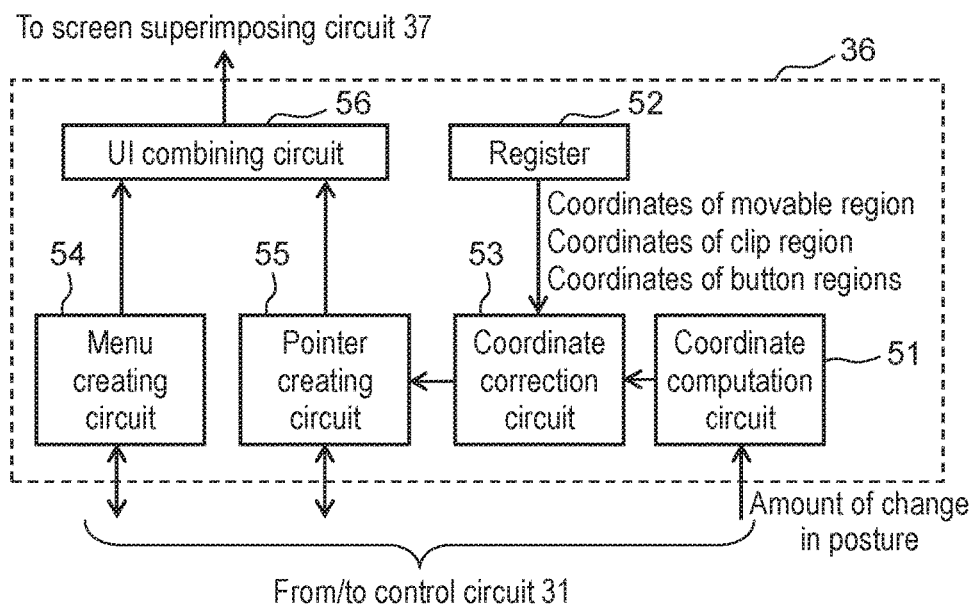
FIG. 2 is a block diagram schematically showing an exemplary configuration of a UI creating circuit of the first exemplary embodiment.

FIG. 2 is a block diagram schematically showing an exemplary configuration of UI creating circuit 36 of the first exemplary embodiment.

UI creating circuit 36 creates a user interface image. The user interface image includes a pointer having a position that changes based on an amount of change in posture of remote controller 2. UI creating circuit 36 includes coordinate computation circuit 51, register 52, coordinate correction circuit 53, menu creating circuit 54, pointer creating circuit 55, and UI (user interface) combining circuit 56.

Coordinate computation circuit 51 obtains an amount of change in posture of remote controller 2 from control circuit 31. Coordinate computation circuit 51 determines virtual coordinates of a pointer in a virtual plane including a user interface image, based on the amount of change in posture of remote controller 2.

Note that the virtual coordinates refer to coordinates in the virtual plane. The virtual plane refers to a virtual plane that is set to create a user interface image in UI creating circuit 36. Then, UI creating circuit 36 creates a user interface image on the virtual plane. Virtual coordinates of the user interface image on the virtual plane are transformed into real coordinates by UI creating circuit 36 (or screen superimposing circuit 37). The real coordinates refer to coordinates corresponding to screen 40 of display 4. By the transformation of the virtual coordinates into the real coordinates, the user interface image on the virtual plane goes into a displayable state on screen 40 of display 4. By this, screen superimposing circuit 37 can generate an output video signal by superimposing the user interface image on a video signal of a program played back. Note that the virtual coordinates and the real coordinates may differ from each other or may be the same.

Register 52 stores coordinates of predetermined regions in the virtual plane. The predetermined regions include a movable region, a clip region, and at least one button region, and register 52 stores coordinates of those regions.

The movable region is a smaller region than the user interface image in the virtual plane, and represents a pointer movable range. The clip region is a larger region than the movable region and is provided outside the movable region in the virtual plane so as to enclose the movable region, and represents a range where movement of virtual coordinates of the pointer is limited. The button region is a region that is selectable by the pointer and that allows control circuit 31 to perform some sort of process (e.g., recording or playback of a program) when the region is selected.

Initial values of virtual coordinates of pointer 111 (see FIG. 7) are, for example, coordinates of a center of the movable region. Coordinate computation circuit 51 determines virtual coordinates of the pointer by accumulating amounts of change in posture (differences in motion) transmitted from remote controller 2.

Coordinate correction circuit 53 corrects the virtual coordinates of the pointer based on the coordinates of the movable region, the clip region, and the button region, and thereby determines real coordinates of the pointer to be displayed on the user interface image.

Menu creating circuit 54 creates a program selection menu, based on a program database created by program DB creating circuit 34. The program selection menu refers to a menu for enabling the user to select a desired program from a plurality of programs recorded by normal recorder 10 or channel recorder 20.

Pointer creating circuit 55 creates a pointer to be superimposed on the program selection menu, based on the real coordinates of the pointer.

UI combining circuit 56 creates (a signal representing) a user interface image by combining the program selection menu with the pointer, and sends the created (signal representing a) user interface image to screen superimposing circuit 37.

Menu creating circuit 54 sends coordinates of an element (a program selected by the pointer, etc.) included in the created program selection menu to control circuit 31.

Pointer creating circuit 55 sends coordinates of the created pointer to control circuit 31.

Figure 3:
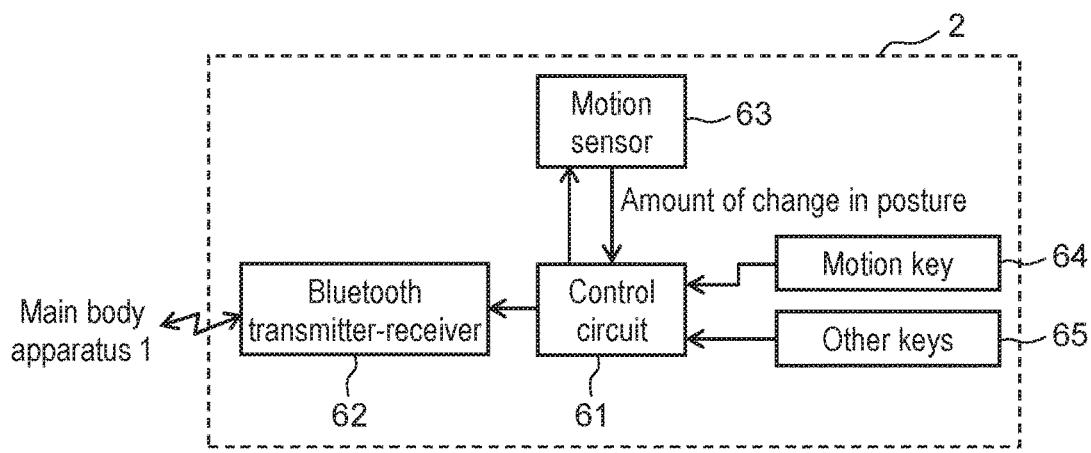
FIG. 3 is a block diagram schematically showing an exemplary configuration of a remote controller of the first exemplary embodiment.

FIG. 3 is a block diagram schematically showing an exemplary configuration of remote controller 2 of the first exemplary embodiment.

Remote controller 2 includes control circuit 61, Bluetooth transmitter-receiver 62, motion sensor 63, motion key 64, and other keys 65.

Note that FIG. 3 shows components related to the present exemplary embodiment among a plurality of components included in remote controller 2, and omits other components. The other components include components (e.g., a power supply circuit) that are commonly included in a remote controller, but description of the other components is omitted.

Control circuit 61 controls operation of each block of remote controller 2. In addition, when motion key 64 or other keys 65 is pressed by the user, a signal indicating that motion key 64 or other keys 65 has been pressed by the user is sent to control circuit 61 from motion key 64 or other keys 65.

Motion sensor 63 is, for example, a gyro sensor. Motion sensor 63 operates when motion key 64 is pressed, and detects an amount of change in posture of remote controller 2 for when remote controller 2 is shaken up and down or left and right. The detected amount of change in posture is sent to Bluetooth transmitter-receiver 62 through control circuit 61.

Note that motion sensor 63 may detect an amount of change in posture at all times. In that case, only when motion key 64 is pressed, a detected amount of change in posture may be sent to Bluetooth transmitter-receiver 62 from control circuit 61.

Bluetooth transmitter-receiver 62 is an example of a transmitter. Bluetooth transmitter-receiver 62 transmits a user command (control signal) including the amount of change in posture to main body apparatus 1 by communicating with main body apparatus 1.

Figure 4:
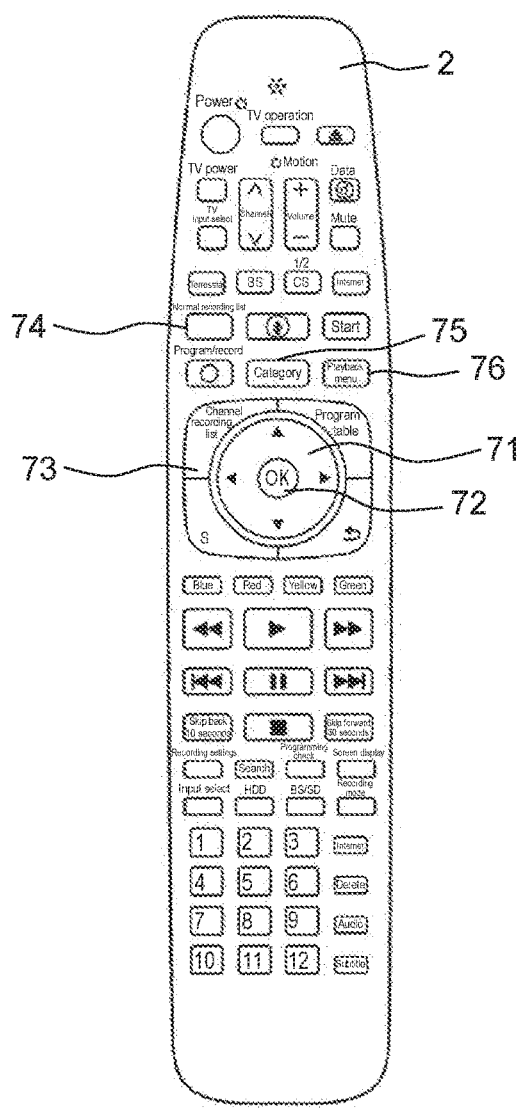
FIG. 4 is a top view of the remote controller of the first exemplary embodiment.

FIG. 4 is a top view of remote controller 2 of the first exemplary embodiment.

FIG. 4 shows an example of a plurality of keys included in remote controller 2. Other keys 65 shown in FIG. 3 include, for example, cursor key 71, OK key 72, channel recording list key 73, normal recording list key 74, category list key 75, and playback menu key 76. In addition, cursor key 71 includes an up key, a down key, a left key, and a right key.

Figure 5:
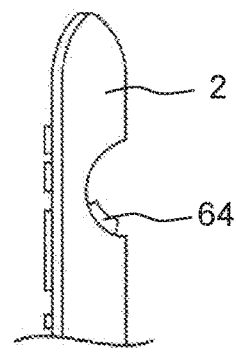
FIG. 5 is a side view of the remote controller of the first exemplary embodiment.

FIG. 5 is a side view of remote controller 2 of the first exemplary embodiment.

As shown in FIG. 5, a back of remote controller 2 (a back side of a side where the plurality of keys are provided) is provided with an indentation in which a user's finger can fit. Then, motion key 64 is disposed in the indentation so that the user can easily shake remote controller 2 up and down or left and right with motion key 64 kept pressed.

[1-2. Operation]

[1-2-1. Program Selection Menus]

In order to enable the user to select a desirable program from among recorded programs, main body apparatus 1 of the recording and playback apparatus presents a plurality of program selection menus to the user. Main body apparatus 1 presents, for example, following three program selection menus to the user.

(1) Channel Recording List

A channel recording list is a program selection menu for enabling the user to select a desired program from a plurality of programs recorded by channel recorder 20. The channel recording list has a program table format where a plurality of programs are arranged two-dimensionally by channel and time.

(2) Normal Recording List

A normal recording list is a program selection menu for enabling the user to select a desired program from a plurality of programs recorded by normal recorder 10. The normal recording list has a format where a plurality of programs are arranged chronologically.

(3) Category List

A category list is a program selection menu for enabling the user to select a desired program from a plurality of programs recorded by channel recorder 20. The category list has a format where a plurality of programs are classified and arranged by category.

In the program selection menus (i.e., the channel recording list, the normal recording list, and the category list), a plurality of recorded programs are classified and arranged by different classification methods.

In general, when a number of menus presented to the user increases, a number of transitions performed between the menus increases, complicating user operations. Therefore, a recording and playback apparatus is desired that can allow the user to select and play back his/her desired program from among recorded programs with a relatively small amount of time and trouble by suppressing complication of user operations.

UI creating circuit 36 creates UI images of program selection menus with a plurality of pairs where a plurality of recorded programs are classified and arranged by a plurality of classification methods. For example, when UI creating circuit 36 creates a program selection menu for the channel recording list, UI creating circuit 36 creates a UI image where a channel and a date (or time) are paired up.

Each program selection menu has a first program selection menu and a second program selection menu. The first program selection menu and the second program selection menu include a plurality of arrays of a plurality of programs classified by the same classification method. Namely, the channel recording list has a first program selection menu and a second program selection menu that are displayed on display 4 in a channel recording list format. The normal recording list has a first program selection menu and a second program selection menu that are displayed on display 4 in a normal recording list format. The category list has a first program selection menu and a second program selection menu that are displayed on display 4 in a category list format.

Note that when a recorded program is not played back, the first program selection menu is displayed on display 4, and when a recorded program is played back, the second program selection menu is displayed on display 4 so as to be partially superimposed on video of the program being played back.

[1-2-1-1. Playback of a Program Using a Channel Recording List]

Figure 6:
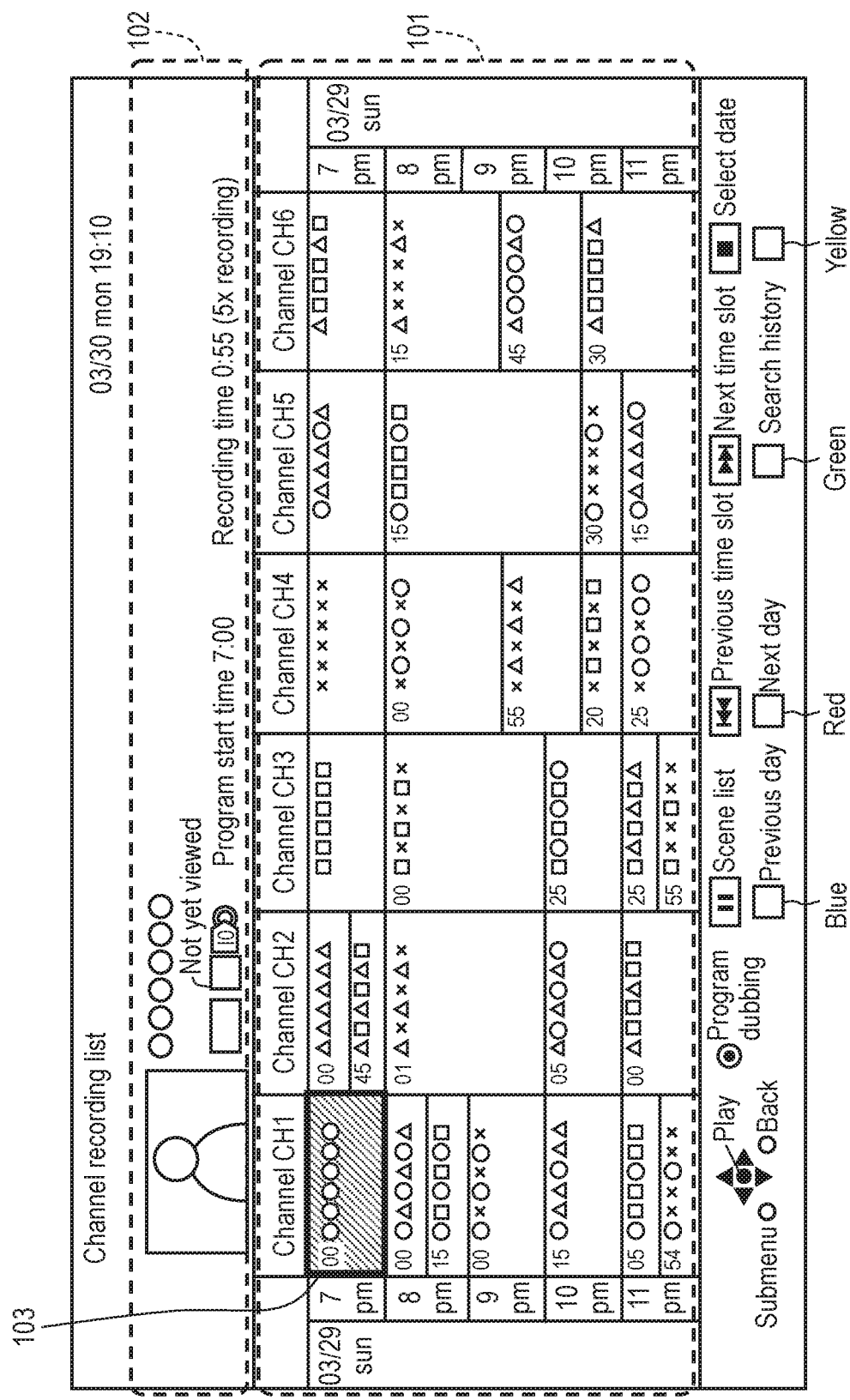
FIG. 6 is a diagram showing an example of a screen of a channel recording list of the first exemplary embodiment.

When channel recording list key 73 of remote controller 2 is pressed down in a state in which a recorded program is not played back, a first program selection menu for a channel recording list is displayed on display 4 by control circuit 31. As shown in FIG. 6 which will be described later, the first program selection menu for a channel recording list has a program table format where a plurality of programs recorded by channel recorder 20 are arranged two-dimensionally with a horizontal axis being a channel and a vertical axis being time. Therefore, in the first program selection menu for a channel recording list, the plurality of programs recorded by channel recorder 20 are classified into a plurality of arrays corresponding to a plurality of channels having broadcast the programs. Then, in a display field of each channel, programs of the channel are arranged chronologically.

When a user command for instructing to call a second program selection menu is input in a state in which a recorded program is played back, a second program selection menu is displayed on display 4 by control circuit 31 so as to be partially superimposed on video of the program being played back. The second program selection menu is a program selection menu that uses a classification method conforming to a program selection menu that is used when the program being played back is selected. For example, if it is time when a program that is selected on a first program selection menu for a channel recording list is played back, then when a user command for instructing to call a second program selection menu is input, a second program selection menu conforming to a format of the channel recording list is displayed on display 4 so as to be partially superimposed on video of the program being played back. Likewise, if it is time when a program that is selected on a first program selection menu for a normal recording list is played back, then a second program selection menu conforming to a format of the normal recording list is displayed on display 4, and if it is time when a program that is selected on a first program selection menu for a category list is played back, then a second program selection menu conforming to a format of the category list is displayed on display 4. Note that in the present exemplary embodiment a user command for instructing to call a second program selection menu is input to remote controller 2 by pressing down playback menu key 76 of remote controller 2, and transmitted to main body apparatus 1 from remote controller 2.

As described above, when playback menu key 76 of remote controller 2 is pressed down in a state in which a program selected on a channel recording list is played back, a second program selection menu for the channel recording list is displayed on display 4 by control circuit 31.

The second program selection menu includes a plurality of tab menus and a plurality of detailed menus for the respective tab menus. When a user command for instructing to call a second program selection menu is input, control circuit 31 allows display 4 to display a plurality of tab menus. The plurality of tab menus are displayed, for example, along a top side, a left side, a bottom side, and a right side of screen 40 of display 4.

When a user command for selecting one of the plurality of tab menus is input in a state in which the second program selection menu is displayed on display 4, control circuit 31 allows display 4 to display a detailed menu corresponding to the selected one tab menu. The detailed menus for the respective plurality of tab menus are also displayed, for example, along the top side, left side, bottom side, and right side of screen 40 of display 4.

When a user command for selecting one tab menu is input, a detailed menu corresponding to the tab menu may include a plurality of icons representing a plurality of arrays (e.g., icons of a plurality of channels). At this time, control circuit 31 may highlight an icon of an array to which a program being played back belongs (e.g., one channel having broadcast the program being played back) in the detailed menu by a cursor or other display methods.

When a user command for selecting another tab menu is input, a detailed menu corresponding to the tab menu may include an array to which the program being played back belongs (e.g., a plurality of programs having been broadcast on a channel having broadcast the program being played back). At this time, control circuit 31 may highlight the program being played back in the detailed menu by a cursor or other display methods.

When a user command for selecting still another tab menu is input, in a detailed menu corresponding to the tab menu, for example, recommended programs similar to the program being played back may be displayed on display 4.

When a user command for selecting yet another tab menu is input, in a detailed menu corresponding to the tab menu, for example, a list of representative scenes of the program being played back may be displayed on display 4. Note that information on the recommended programs and the list of scenes are obtained from, for example, program information server apparatus 3.

[1-2-1-2. Playback of a Program Using a Normal Recording List]

When normal recording list key 74 of remote controller 2 is pressed down in a state in which a recorded program is not played back, a first program selection menu for a normal recording list is displayed on display 4 by control circuit 31. A plurality of programs recorded by normal recorder 10 are classified by a plurality of predetermined tags representing program categories (e.g., genres). Then, in the first program selection menu for a normal recording list, the plurality of tags are arranged and displayed on display 4. When one tag is selected by the user, a program list having a format where programs having the tag are arranged chronologically is displayed on display 4. For example, an "all" tag represents all programs recorded by normal recorder 10. As such, a plurality of programs recorded by normal recorder 10 are classified into a plurality of arrays corresponding to a plurality of tags, respectively. Then, in a display field of each tag, a plurality of programs having the tag are arranged chronologically.

When playback menu key 76 of remote controller 2 is pressed down in a state in which a program selected from the normal recording list is played back, a second program selection menu for the normal recording list is displayed on display 4 by control circuit 31. As with a second program selection menu for a channel recording list, the second program selection menu for the normal recording list includes a plurality of tab menus and a plurality of detailed menus for the respective tab menus.

[1-2-1-3. Playback of a Program Using a Category List]

When category list key 75 of remote controller 2 is pressed down in a state in which a recorded program is not played back, a first program selection menu for a category list is displayed on display 4 by control circuit 31. In the first program selection menu for a category list, a plurality of programs recorded by channel recorder 20 are classified into a plurality of arrays corresponding to a plurality of categories, respectively. For example, of the plurality of programs recorded by channel recorder 20, only newly recorded programs may be classified into a plurality of arrays corresponding to a plurality of categories, respectively, and presented to the user.

The first program selection menu for a category list may include a plurality of pages. For example, of the plurality of pages, a first page may include a history area indicating categories of programs that are often viewed by the user of the recording and playback apparatus; a ranking area indicating program ranking; and a news area indicating a list of most talked-about news. The program ranking and the list of most talked-about news are obtained from, for example, program information server apparatus 3. For example, of the plurality of pages, a second page may indicate categories of programs classified by genre. For example, of the plurality of pages, a third page may indicate categories of programs searched by conditions set by the user (e.g., a genre and a keyword(s)). A button region of each category on each page represents, for example, a thumbnail image of one program included in the category.

Movement between the pages of the first program selection menu is performed by selecting, by a pointer, a predetermined button region on a user interface image. Instead of this method, cursor key 71 of remote controller 2 may be used for movement between the pages of the first program selection menu.

For example, when one category in the history area is selected by the user, unviewed programs in the category are played back in order of oldest first by control circuit 31, according to a user's playback history. For example, when one ranking category in the ranking area is selected by the user, programs in the category are played back in order of ranking by control circuit 31. For example, when one news category in the news area is selected by the user, news scenes are played back in descending order of a number of broadcasts of news by control circuit 31. For example, when one of categories of programs classified by genre is selected by the user, a latest program in the category is played back by control circuit 31. When one of categories of programs searched by conditions set by the user is selected by the user, a latest program in the category is played back by control circuit 31.

When playback menu key 76 of remote controller 2 is pressed down in a state in which a program selected from the category list is played back, a second program selection menu is displayed on display 4 by control circuit 31. As with second program selection menus for a channel recording list and a normal recording list, the second program selection menu for the category list includes a plurality of tab menus and a plurality of detailed menus corresponding to the respective tab menus. For example, in case where an array of programs displayed in a detailed menu indicates ranking for a number of recordings or most talked-about news, the programs are arranged in order of ranking. Alternatively, in case where an array of programs displayed in a detailed menu indicates a genre such as a drama, the programs are arranged in order of oldest first. Alternatively, in case where an array of programs displayed in a detailed menu indicates a playback history, the programs are arranged in order of newest first.

The first program selection menu for the category list may include only a screen of one page, or may include screens of two pages, or may include screens of four or more pages. In addition, first program selection menus for a channel recording list and a normal recording list may include screens of two or more pages.

[1-2-1-4. Transition Between Program Selection Menus]

When, in a state in which a second program selection menu is displayed on display 4, a user command is input to instruct to display another second program selection menu that uses a different classification method than a classification method used by the second program selection menu being displayed on display 4, control circuit 31 allows display 4 to display another second program selection menu, according to the user command. Namely, control circuit 31 can move between a detailed menu for a channel recording list, a detailed menu for a category list, and a detailed menu for a normal recording list, according to a user command.

Movement between second program selection menus is performed by selecting, by a pointer, a predetermined button region on a user interface image. Instead of this method, cursor key 71 of remote controller 2 may be used for movement between pages of second program selection menus.

[1-2-1-5. End of Playback]

When playback of a recorded program has ended, control circuit 31 allows display 4 to display a first program selection menu that uses a same classification method as a classification method used by a first program selection menu or a second program selection menu that is used when the program whose playback has ended is selected.

After the playback of the program has ended, control circuit 31 may highlight the program whose playback has ended, in the first program selection menu displayed on display 4.

[1-2-2. Motion Menu]

FIG. 6 is a diagram showing an example of a screen of a channel recording list of the first exemplary embodiment. A drawing shown in FIG. 6 is an example of a first program selection menu for a channel recording list that is displayed on display 4 shown in FIG. 1 when channel recording list key 73 of remote controller 2 is pressed down.

Program table area 101 has a program table format where a plurality of programs recorded by channel recorder 20 are arranged two-dimensionally with a horizontal axis being a channel and a vertical axis being time. The user can select a program by moving cursor 103 in program table area 101, using cursor key 71 of remote controller 2. In description area 102, description of the program selected by cursor 103 is displayed. When OK key 72 of remote controller 2 is pressed down, main body apparatus 1 starts playback of the program selected by cursor 103.

Figure 7:
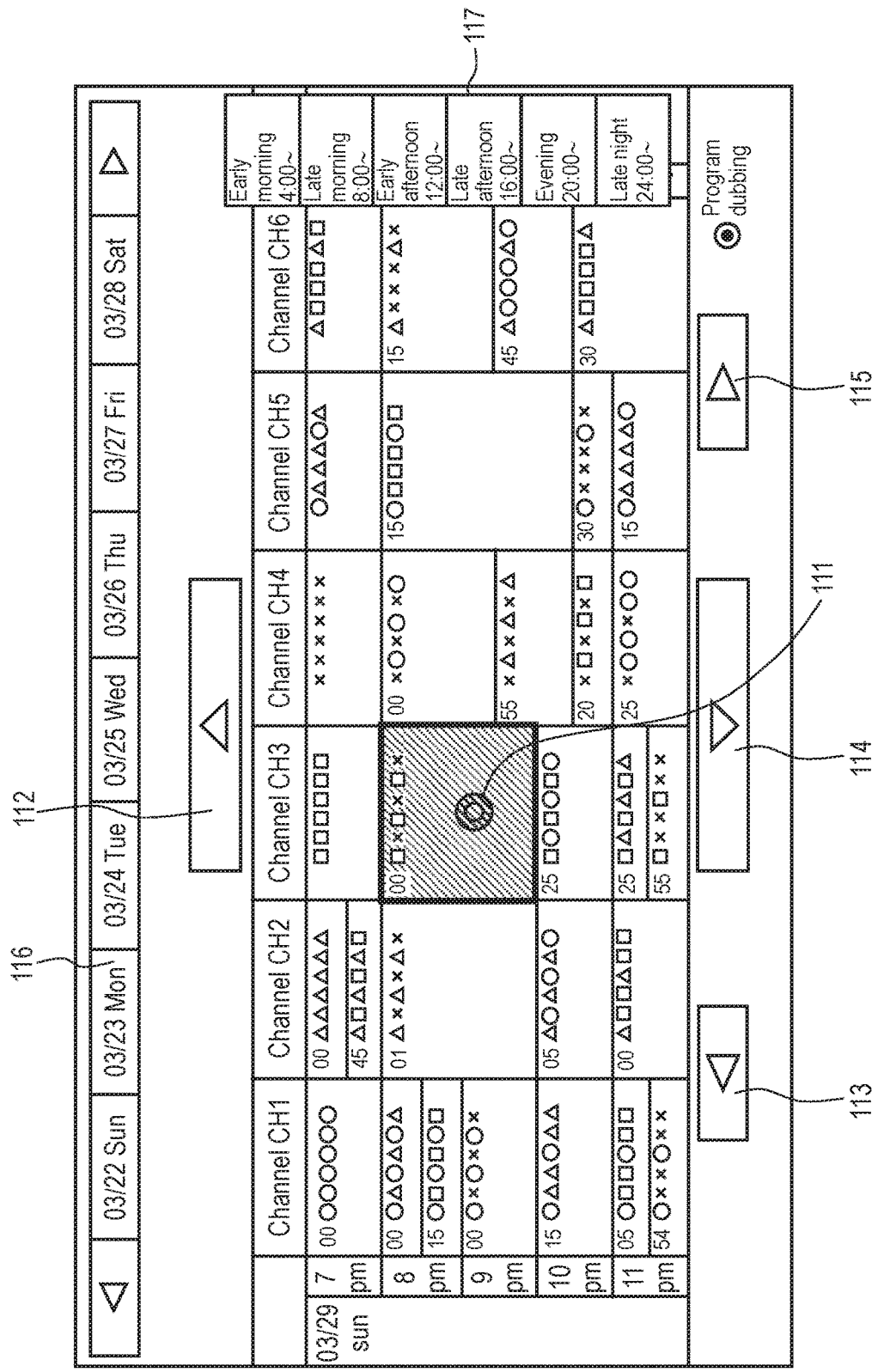
FIG. 7 is a diagram showing an example of a motion menu of the first exemplary embodiment.

FIG. 7 is a diagram showing an example of a motion menu of the first exemplary embodiment. A drawing shown in FIG. 7 is an example of a motion menu that is displayed on display 4 shown in FIG. 1 when motion key 64 of remote controller 2 is pressed down.

The motion menu is displayed on display 4 so as to be superimposed on the first program selection menu for a channel recording list shown in FIG. 6. The motion menu includes a plurality of button regions corresponding to the plurality of programs (regions set for respective display fields of the programs) in program table area 101 of FIG. 6; pointer 111; and button regions 112 to 117 which are links for moving to another page. Button region 112 is a link for moving to a page including programs in a time slot immediately before the programs displayed in program table area 101. Button region 114 is a link for moving to a page including programs in a time slot immediately after the programs displayed in program table area 101. Button region 113 and button region 115 are a link for moving to a page including channels adjacent to channels displayed in program table area 101. Button region 116 is a link for moving to a page including programs for a date displayed in that region. Button region 117 is a link for moving to a page including programs in a time slot displayed in that region.

The user can select a program displayed in program table area 101 or a link displayed in the motion menu by moving pointer 111 by shaking remote controller 2 up and down or left and right when the motion menu exemplified in FIG. 7 is displayed on display 4. In the example shown in FIG. 7, pointer 111 is present on a program "☐×☐×☐×" on channel CH 3 and this program is selected.

Then, when OK key 72 of remote controller 2 is pressed down in a state in which the program is selected by pointer 111, main body apparatus 1 starts playback of the program selected by pointer 111. By this, a screen displayed on display 4 is switched from the first program selection menu for a channel recording list on which the motion menu is superimposed to playback video of the selected program. In addition, as exemplified in FIG. 8, when OK key 72 of remote controller 2 is pressed down in a state in which any of button regions 112 to 117 is selected by pointer 111, a screen displayed on display 4 moves to another page, according to button region 112 to 117 selected by pointer 111.

Next, movable region 121 and clip region 122 in the motion menu will be described.

Figure 8:
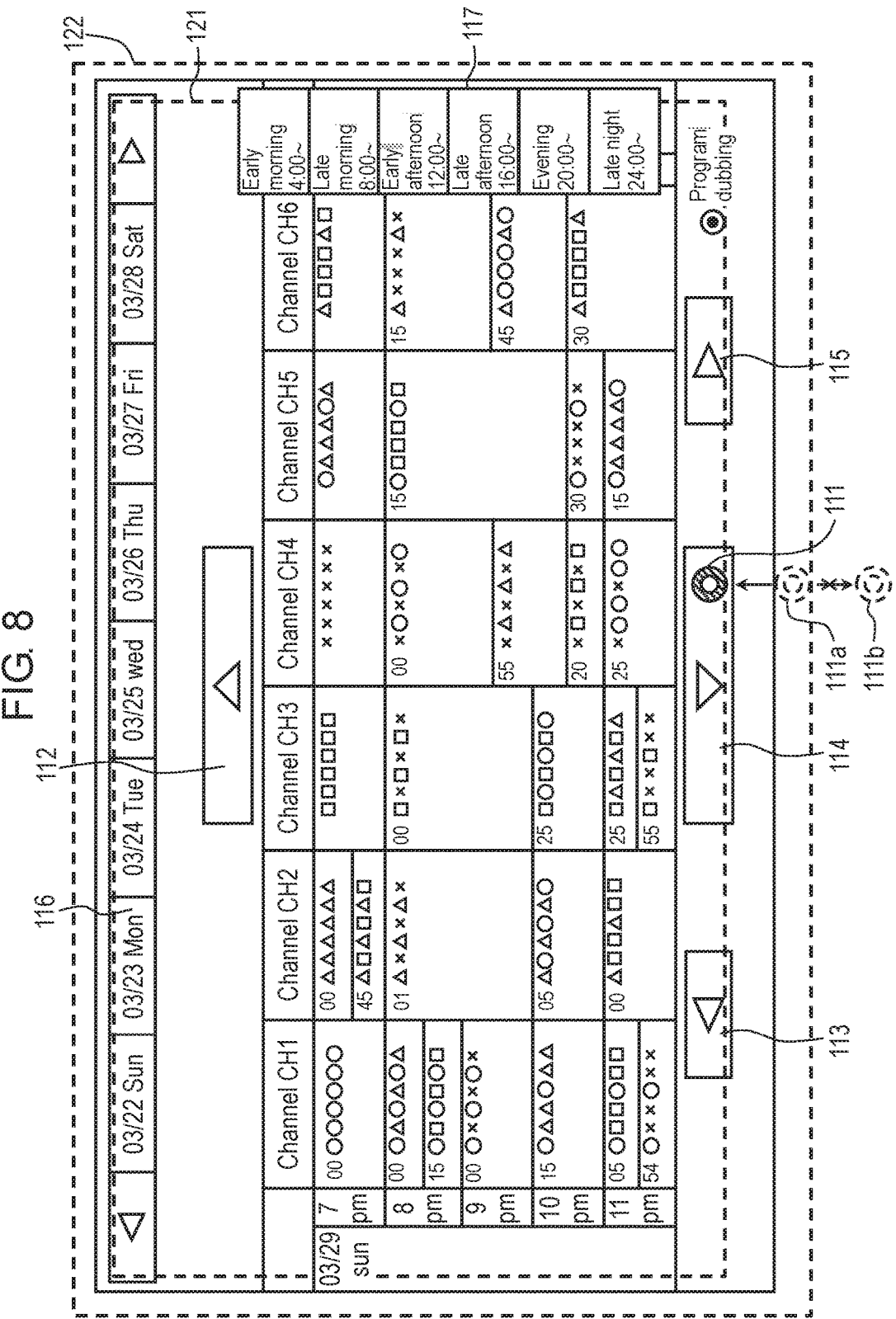
FIG. 8 is a diagram showing examples of a movable region and a clip region of the first exemplary embodiment.

FIG. 8 is a diagram showing examples of movable region 121 and clip region 122 of the first exemplary embodiment.

As described above, movable region 121 is a smaller region than a user interface image in a virtual plane including the user interface image, and represents a range where pointer 111 is movable. Clip region 122 is a larger region than movable region 121 and provided outside movable region 121 in the virtual plane, and represents a range where movement of virtual coordinates of pointer 111 is limited.

UI creating circuit 36 limits a position of pointer 111 displayed on display 4 within movable region 121. In addition, UI creating circuit 36 limits virtual coordinates of pointer 111 within clip region 122. Therefore, when virtual coordinates of pointer 111 are present in movable region 121, UI creating circuit 36 displays pointer 111 at a position of the virtual coordinates. In addition, when virtual coordinates of pointer 111 are present outside movable region 121 (e.g., position 111a of FIG. 8) in the virtual plane, UI creating circuit 36 displays pointer 111 at a position in movable region 121 closest to the virtual coordinates. Then, when virtual coordinates of pointer 111 have reached a boundary between clip region 122 and an outside of clip region 122 in the virtual plane, UI creating circuit 36 limits the virtual coordinates within clip region 122.

Therefore, even if motion of remote controller 2 is, for example, as exemplified in FIG. 8, to move pointer 111 displayed on button region 114 further downward, UI creating circuit 36 forbids a display position of pointer 111 to move to position 111a. Furthermore, UI creating circuit 36 forbids virtual coordinates of pointer 111 having virtual coordinates of position 111a of FIG. 8 to move to position 111b.

A user interface image includes at least one button region at a position in movable region 121 that is in contact with a boundary between movable region 121 and clip region 122, or at a position in movable region 121 where a distance from the boundary between movable region 121 and clip region 122 is less than a size of pointer 111.

In the example shown in FIG. 8, button regions 113 to 117 are in contact with the boundary between movable region 121 and clip region 122. When virtual coordinates of pointer 111 move from a position of button region 113 to 117 toward an outside of movable region 121 (clip region 122), pointer 111 displayed on display 4 stays at the boundary between movable region 121 and clip region 122 within movable region 121. For example, when virtual coordinates of pointer 111 move from a position of pointer 111 on button region 114 exemplified in FIG. 8 to position 111a, pointer 111 displayed on display 4 stays on button region 114. Reversely, when virtual coordinates of pointer 111 move from position 111a to a position of pointer 111 on button region 114 exemplified in FIG. 8, too, pointer 111 displayed on display 4 stays on button region 114.

As such, in main body apparatus 1, by providing clip region 122 outside movable region 121, even if remote controller 2 is moved by user's hand movement, etc., pointer 111 having been displayed on button region 113 to 117 once is less likely to be shifted from button region 113 to 117. In addition, it becomes easier for the user that operates main body apparatus 1 by displaying a motion menu on display 4 and moving pointer 111 on the motion menu by shaking remote controller 2 up and down or left and right, to dispose pointer 111 on button regions 113 to 117 displayed on display 4.

In addition, in the motion menu exemplified in FIG. 7, button regions 113 to 117 are disposed at positions in movable region 121 that are in contact with the boundary between movable region 121 and clip region 122. Hence, a plurality of button regions corresponding to a plurality of programs (a portion corresponding to program table area 101 of FIG. 6) are suppressed from being covered by button regions 113 to 117 when a motion menu is displayed so as to be superimposed on a first program selection menu for a channel recording list. Therefore, even in case where the user selects a motion menu, main information included in the first program selection menu for a channel recording list of FIG. 6 is suppressed from becoming difficult to view by button regions 113 to 117.

Next, methods for correcting virtual coordinates of pointer 111 (a first correction method and a second correction method) will be described. Note that, in the following, pointer 111 present on button region 112 shown in FIG. 8 will be described as an example.

Figure 9:
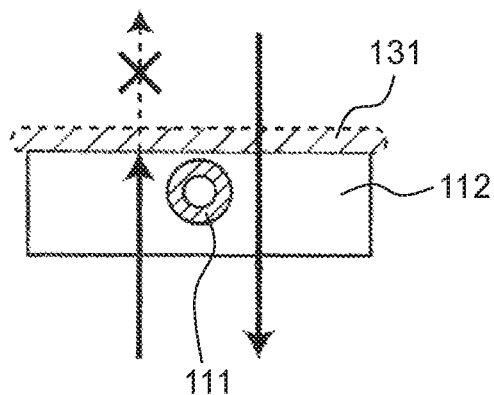
FIG. 9 is a diagram describing a first correction method for virtual coordinates of a pointer of the first exemplary embodiment.

FIG. 9 is a diagram describing a first correction method for virtual coordinates of pointer 111 of the first exemplary embodiment.

When, as exemplified in FIG. 8, button region 112 is disposed at a position in movable region 121 that has a predetermined distance from the boundary between movable region 121 and clip region 122, in order to make pointer 111 less likely to be shifted from button region 112, virtual coordinates of pointer 111 may be corrected as follows.

In the example shown in FIG. 8, a user interface image includes, in movable region 121, at least one button region 112 disposed at a position having a predetermined distance from the boundary between movable region 121 and clip region 122. In such a case, UI creating circuit 36 may provide, as shown in FIG. 9, clip section 131 to a part of a boundary of button region 112. In this case, when virtual coordinates of pointer 111 have moved from a position in button region 112 and reached clip section 131, UI creating circuit 36 limits the virtual coordinates within button region 112. Therefore, even if, when virtual coordinates of pointer 111 are present on button region 112, motion of remote controller 2 is to move pointer 111 further upward, UI creating circuit 36 forbids virtual coordinates of pointer 111 of FIG. 9 to go beyond clip section 131. Due to this, in case where the user operates main body apparatus 1 by displaying a motion menu on display 4 and moving pointer 111 on the motion menu by shaking remote controller 2 up and down or left and right, main body apparatus 1 can prevent pointer 111 from going out of button region 112 or from being shifted to button region 116 against a user's intention. In addition, it becomes easier for the user to dispose pointer 111 on button region 112 displayed on display 4. At this time, UI creating circuit 36 does not limit virtual coordinates of pointer 111 to go beyond clip section 131 in an opposite direction (from a top to a bottom of button region 112).

Figure 10:
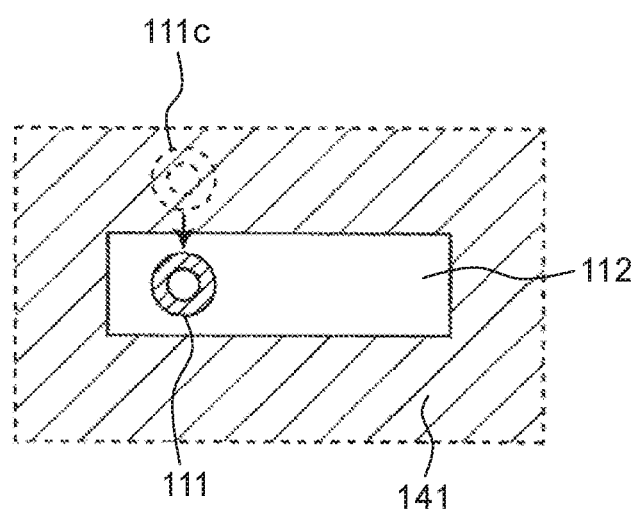
FIG. 10 is a diagram describing a second correction method for virtual coordinates of the pointer of the first exemplary embodiment.

FIG. 10 is a diagram describing a second correction method for virtual coordinates of pointer 111 of the first exemplary embodiment.

In the example shown in FIG. 8, the user interface image includes, in movable region 121, at least one button region 112. When virtual coordinates of pointer 111 are present within a predetermined distance from button region 112 (specifically, when virtual coordinates of pointer 111 are present at position 111c in region 141 provided outside button region 112), UI creating circuit 36 displays pointer 111 at a position in button region 112 closest to the virtual coordinates. By this, it becomes easier for the user to dispose pointer 111 on button region 112 displayed on display 4. In addition, pointer 111 having been disposed on button region 112 once is less likely to be shifted from button region 112. However, when virtual coordinates of pointer 111 have moved out of region 141, UI creating circuit 36 displays pointer 111 at a position of the virtual coordinates.

[1-2-3. Flowchart]

Next, with reference to FIGS. 11 and 12, operation of main body apparatus 1 of the recording and playback apparatus will be described. Note that, in the following, description will be made, as an example, of operation performed when a first program selection menu for a channel recording list is displayed on display 4. Description of operation performed when other program selection menus are displayed on display 4 is omitted, but the operation is substantially the same.

Figure 11:
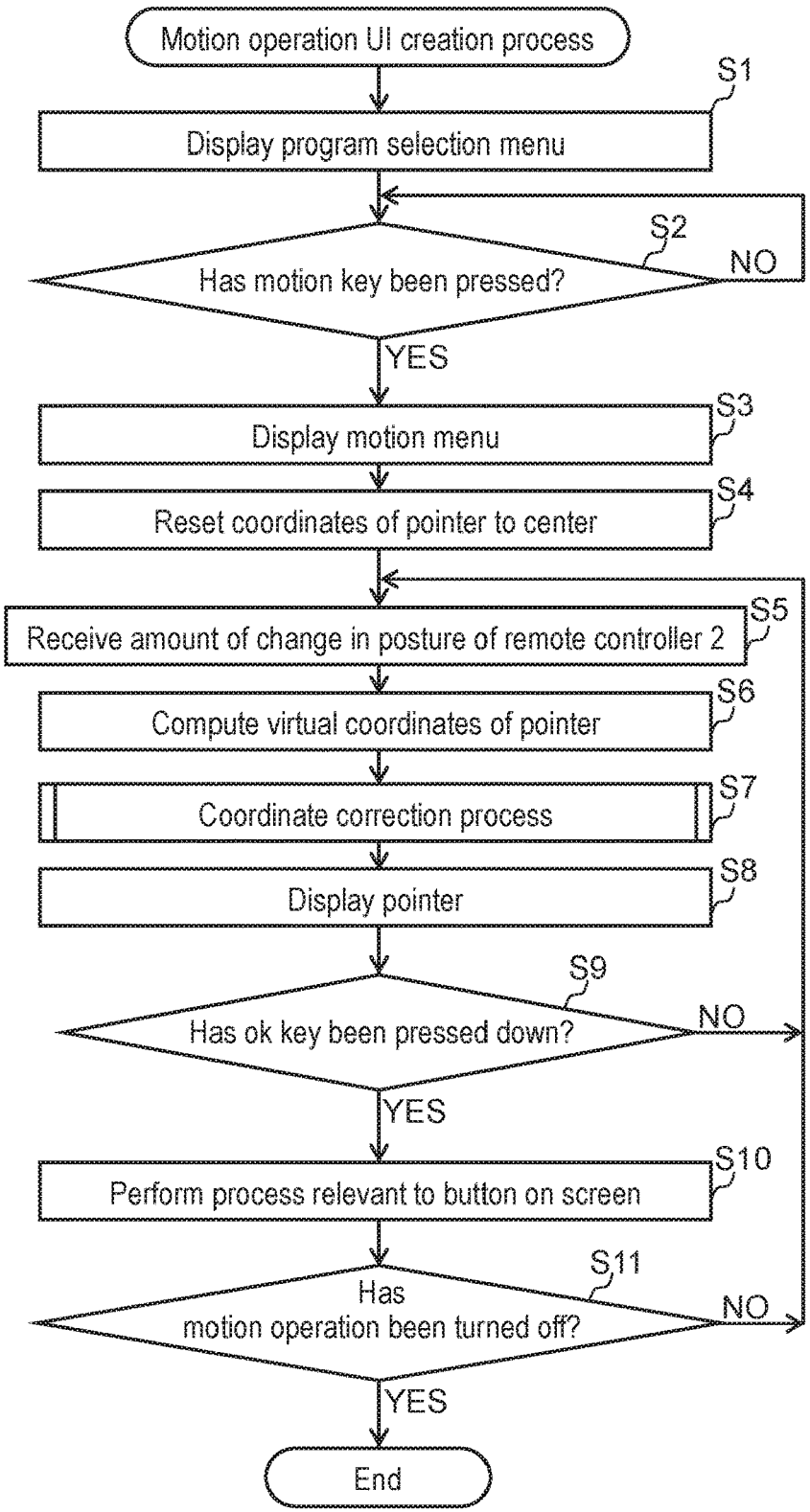
FIG. 11 is a flowchart showing an example of a motion operation UI creation process which is performed by the UI creating circuit of the first exemplary embodiment.

FIG. 11 is a flowchart showing an example of a motion operation UI creation process which is performed by UI creating circuit 36 of the first exemplary embodiment.

When channel recording list key 73 of remote controller 2 is pressed down in a state in which a recorded program is not played back, UI creating circuit 36 displays a program selection menu shown in FIG. 6 on display 4 (step S1).

UI creating circuit 36 determines whether motion key 64 of remote controller 2 has been pressed (step S2).

In case where it is determined at step S2 that motion key 64 of remote controller 2 has not been pressed (NO at step S2), UI creating circuit 36 repeats a process at step S2.

In case where it is determined at step S2 that motion key 64 of remote controller 2 has been pressed (YES at step S2), UI creating circuit 36 displays a motion menu shown in FIG. 7 on display 4 (step S3).

Coordinate computation circuit 51 in UI creating circuit 36 resets coordinates of pointer 111 and sets the coordinates of pointer 111 to a center (substantially the center) of movable region 121 (step S4).

Coordinate computation circuit 51 in UI creating circuit 36 receives an amount of change in posture transmitted from remote controller 2 (step S5).

Coordinate computation circuit 51 in UI creating circuit 36 computes virtual coordinates of pointer 111, based on the amount of change in posture transmitted from remote controller 2 (step S6).

Coordinate correction circuit 53 in UI creating circuit 36 performs a coordinate correction process (step S7).

Here, a detail of the coordinate correction process at step S7 will be described.

Figure 12:
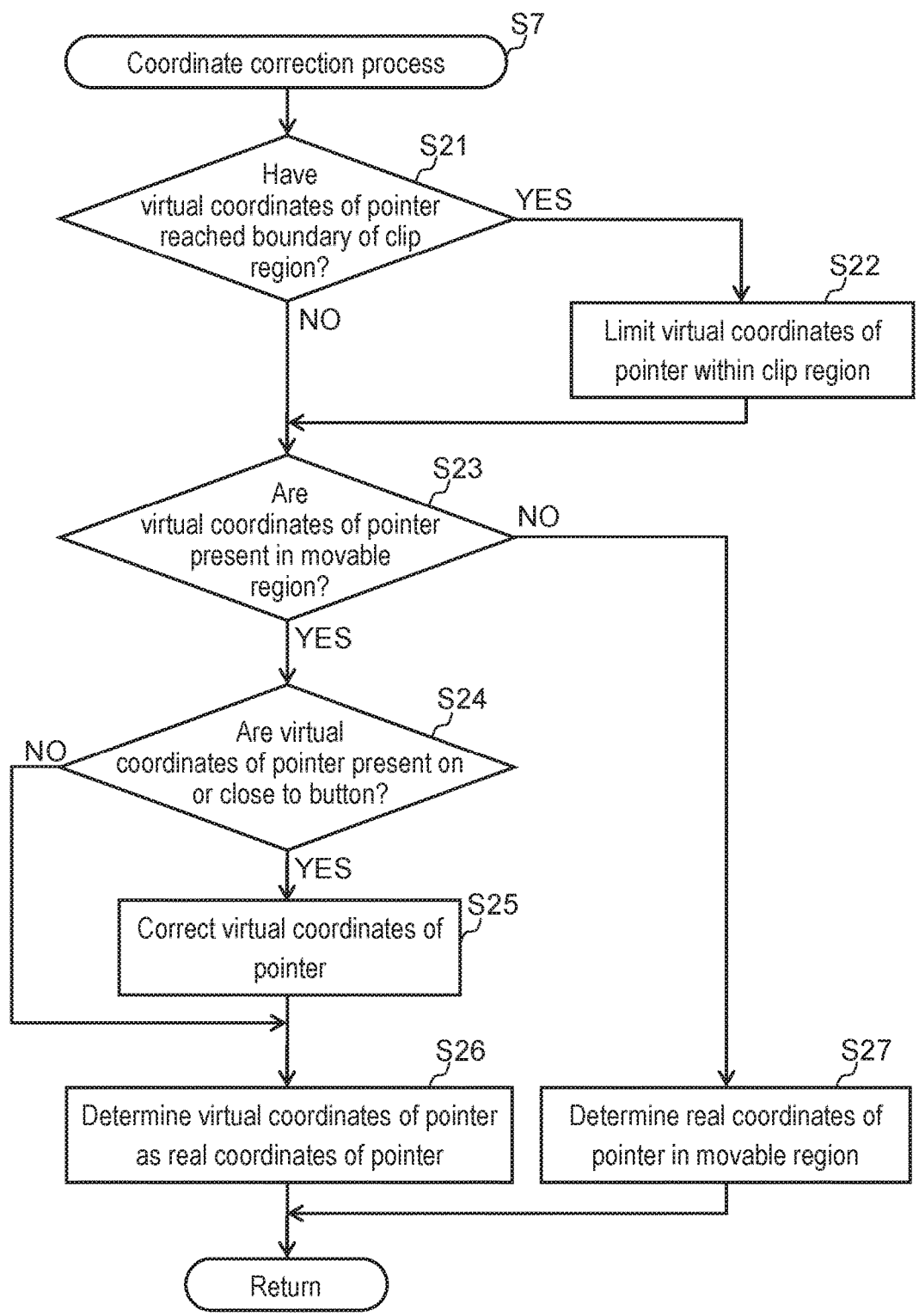
FIG. 12 is a flowchart showing an example of a subroutine of a coordinate correction process of the first exemplary embodiment.

FIG. 12 is a flowchart showing an example of a subroutine of the coordinate correction process of the first exemplary embodiment.

Coordinate correction circuit 53 determines whether the virtual coordinates of pointer 111 have reached a boundary between clip region 122 and an outside of clip region 122 (step S21).

In case where it is determined at step S21 that the virtual coordinates of pointer 111 have reached the boundary between clip region 122 and the outside of clip region 122 (YES at step S21), coordinate correction circuit 53 limits the virtual coordinates of pointer 111 within clip region 122 (step S22).

In case where it is determined at step S21 that the virtual coordinates of pointer 111 have not reached the boundary between clip region 122 and the outside of clip region 122 (NO at step S21), or after a process at step S22 is performed, coordinate correction circuit 53 determines whether the virtual coordinates of pointer 111 are present in movable region 121 (step S23).

In case where it is determined at step S23 that the virtual coordinates of pointer 111 are present in movable region 121 (YES at step S23), coordinate correction circuit 53 determines whether the virtual coordinates of pointer 111 are present on or close to a button region (e.g., any of button regions 112 to 117 and a plurality of button regions corresponding to programs which are shown in FIG. 8) (step S24).

In case where it is determined at step S24 that the virtual coordinates of pointer 111 are present on or close to a button region (YES at step S24), coordinate correction circuit 53 corrects the virtual coordinates of pointer 111 as described with reference to FIG. 9 or 10 (step S25).

In case where it is determined at step S24 that the virtual coordinates of pointer 111 are not present either on or close to a button region (NO at step S24), or after a process at step S25 is performed, coordinate correction circuit 53 determines the virtual coordinates of pointer 111 as real coordinates of pointer 111 (step S26).

In case where it is determined at step S23 that the virtual coordinates of pointer 111 are present outside movable region 121 (NO at step S23), coordinate correction circuit 53 determines a position in movable region 121 closest to the virtual coordinates, as real coordinates of the pointer (step S27).

The above is an example of the subroutine of the coordinate correction process.

Note that the virtual coordinates of pointer 111 in the above description may be virtual coordinates of a center of pointer 111 or may be a plurality of sets of virtual coordinates representing an outline of pointer 111. In addition, a region considered to be close to a button region may be appropriately set based on experiments, etc. For example, coordinate correction circuit 53 may determine that the virtual coordinates of pointer 111 are present on a button region, when the virtual coordinates of the center of pointer 111 are present in the button region. In addition, coordinate correction circuit 53 may determine that the virtual coordinates of pointer 111 are present near a button region, when the virtual coordinates of the center of pointer 111 are not present in the button region, but a part of pointer 111 is present in the button region.

Referring back to FIG. 11, processes at and after step S8 will be described.

UI creating circuit 36 displays pointer 111 having the determined real coordinates, at a position of the real coordinates on screen 40 of display 4 (step S8).

UI creating circuit 36 determines whether OK key 72 of remote controller 2 has been pressed down (step S9).

In case where it is determined at step S9 that OK key 72 of remote controller 2 has not been pressed down (NO at step S9), UI creating circuit 36 brings processing back to step S5 and performs processes at and after step S5.

In case where it is determined at step S9 that OK key 72 of remote controller 2 has been pressed down (YES at step S9), UI creating circuit 36 or control circuit 31 performs a process corresponding to the determined button region on screen 40 (step S10).

In case where, at step S10, the process corresponding to the determined button region on screen 40 is, for example, movement between pages on a user interface image, UI creating circuit 36 performs the process. In case where the process corresponding to the determined button region on screen 40 is, for example, recording or playback of a program, control circuit 31 performs the process.

UI creating circuit 36 determines whether a motion operation has been turned off (step S11).

In case where it is determined at step S11 that the motion operation has been turned off (YES at step S11), UI creating circuit 36 ends the process.

In case where it is determined at step S11 that the motion operation has not been turned off (NO at step S11), UI creating circuit 36 brings processing back to step S5 and performs processes at and after step S5.

[1-3. Effects, Etc.]

As described above, in the present exemplary embodiment, a remote control system includes a main body apparatus and a remote controller. The remote controller includes a motion sensor and a transmitter. The motion sensor detects an amount of change in posture of the remote controller. The transmitter transmits a control signal including the amount of change in posture to the main body apparatus. The main body apparatus includes a receiver, a user interface creator, and a controller. The receiver receives the control signal transmitted from the remote controller. The user interface creator creates a user interface image including a pointer having a position that changes based on the amount of change in posture. The controller controls operation of the main body apparatus, according to the control signal. The user interface creator determines virtual coordinates of the pointer in a virtual plane including the user interface image, based on the amount of change in posture. In addition, when the virtual coordinates of the pointer are present in a movable region in the virtual plane, the user interface creator displays the pointer at a position of the virtual coordinates, the movable region being a smaller region than the user interface image. In addition, when the virtual coordinates of the pointer are present outside the movable region in the virtual plane, the user interface creator displays the pointer at a position in the movable region closest to the virtual coordinates. Then, when the virtual coordinates of the pointer are present in a clip region and have reached a boundary between the clip region and an outside of the clip region in the virtual plane, the user interface creator limits the virtual coordinates within the clip region, the clip region being a larger region than the movable region.

In addition, in the present exemplary embodiment, an electronic device includes a user interface creator that creates a user interface image including a pointer having a position that changes based on an input signal. The user interface creator determines virtual coordinates of the pointer in a virtual plane including the user interface image, based on the input signal. In addition, when the virtual coordinates of the pointer are present in a movable region in the virtual plane, the user interface creator displays the pointer at a position of the virtual coordinates, the movable region being a smaller region than the user interface image. In addition, when the virtual coordinates of the pointer are present outside the movable region in the virtual plane, the user interface creator displays the pointer at a position in the movable region closest to the virtual coordinates. Then, when the virtual coordinates of the pointer are present in a clip region and have reached a boundary between the clip region and an outside of the clip region in the virtual plane, the user interface creator limits the virtual coordinates within the clip region, the clip region being a larger region than the movable region.

Note that the recording and playback apparatus shown in the exemplary embodiment is an example of the remote control system. Main body apparatus 1 is an example of the main body apparatus and is also an example of the electronic device. Remote controller 2 is an example of the remote controller. Motion sensor 63 is an example of the motion sensor. Bluetooth transmitter-receiver 62 is an example of the transmitter. Bluetooth transmitter-receiver 32 is an example of the receiver. UI creating circuit 36 is an example of the user interface creator. Control circuit 31 is an example of the controller. Pointer 111 is an example of the pointer. Movable region 121 is an example of the movable region. Clip region 122 is an example of the clip region. An amount of change in posture is an example of the input signal.

For example, in an example shown in the first exemplary embodiment, the recording and playback apparatus includes main body apparatus 1 and remote controller 2. Remote controller 2 includes motion sensor 63 and Bluetooth transmitter-receiver 62. Motion sensor 63 detects an amount of change in posture of remote controller 2. Bluetooth transmitter-receiver 62 transmits a control signal including the amount of change in posture to main body apparatus 1. Main body apparatus 1 includes Bluetooth transmitter-receiver 32, UI creating circuit 36, and control circuit 31. Bluetooth transmitter-receiver 32 receives the control signal transmitted from remote controller 2. UI creating circuit 36 creates a user interface image including pointer 111 having a position that changes based on the amount of change in posture. Control circuit 31 controls operation of main body apparatus 1, according to the control signal. UI creating circuit 36 determines virtual coordinates of pointer 111 in a virtual plane including the user interface image, based on the amount of change in posture. When the virtual coordinates of pointer 111 are present in movable region 121 in the virtual plane, UI creating circuit 36 displays pointer 111 at a position of the virtual coordinates, movable region 121 being a smaller region than the user interface image. When the virtual coordinates of pointer 111 are present outside movable region 121 in the virtual plane, UI creating circuit 36 displays pointer 111 at a position in movable region 121 closest to the virtual coordinates. When the virtual coordinates of pointer 111 are present in clip region 122 and have reached a boundary between clip region 122 and an outside of clip region 122 in the virtual plane, UI creating circuit 36 limits the virtual coordinates within clip region 122, clip region 122 being a larger region than movable region 121.

By this, in an electronic device such as a recording and playback apparatus that presents a user with a user interface image including pointer 111 that moves according to motion of remote controller 2, movement of pointer 111 against user's intentions caused by hand movement, etc., can be made less likely to occur.

In the remote control system, initial values of the virtual coordinates of the pointer may be coordinates of a center of the movable region.

For example, in an example shown in the first exemplary embodiment, in the recording and playback apparatus, initial values of virtual coordinates of pointer 111 are coordinates of a center (substantially the center) of movable region 121.

By this, in an electronic device such as a recording and playback apparatus, movement of pointer 111 against user's intentions caused by a reference position of pointer 111 shifted due to motion sensor error can be made less likely to occur.

In the remote control system, the user interface image may include at least one button region presented in the movable region and in contact with a boundary of the movable region.

Note that button regions 113 to 117 are examples of the button region.

For example, in an example shown in the first exemplary embodiment, in the recording and playback apparatus, a user interface image includes button regions 113 to 117 present in movable region 121 and in contact with a boundary between movable region 121 and clip region 122.

By this, in case where the user operates main body apparatus 1 by displaying a motion menu on display 4 and moving pointer 111 on the motion menu by shaking remote controller 2 up and down or left and right, in an electronic device such as a recording and playback apparatus, after pointer 111 has been disposed on any of button regions 113 to 117 once, pointer 111 can be made less likely to be shifted from that button region. In addition, it becomes easier for the user to dispose pointer 111 on button regions 113 to 117 displayed on display 4. In addition, main information included in a user interface image can be suppressed from being covered by button regions 113 to 117 when the user displays a motion menu on display 4.

In the remote control system, the user interface image may include at least one button region present in the movable region and having a predetermined distance from the boundary of the movable region. A part of a boundary of the button region may be a clip section. When the virtual coordinates of the pointer have moved from a position in the button region and reached the clip section, the user interface creator may limit the virtual coordinates within the button region.

Note that button region 112 is an example of the button region. Clip section 131 is an example of the clip section.

For example, in an example shown in the first exemplary embodiment, in the recording and playback apparatus, a user interface image includes, in movable region 121, button region 112 having a predetermined distance from the boundary between movable region 121 and clip region 122. A part of a boundary of button region 112 is clip section 131. When virtual coordinates of pointer 111 have moved from a position in button region 112 and reached clip section 131, UI creating circuit 36 limits the virtual coordinates within button region 112.

By this, in case where the user operates main body apparatus 1 by displaying a motion menu on display 4 and moving pointer 111 on the motion menu by shaking remote controller 2 up and down or left and right, in an electronic device such as a recording and playback apparatus, after pointer 111 has been disposed on button region 112 once, pointer 111 can be made less likely to be shifted from button region 112. In addition, it becomes easier for the user to dispose pointer 111 on button region 112 displayed on display 4.

In the remote control system, the user interface image may include, in the movable region, at least one button region. When the virtual coordinates of the pointer are present within a predetermined distance from the button region, the user interface creator may display the pointer at a position in the button region closest to the virtual coordinates.

Note that button region 112 is an example of the button region. Region 141 is an example of a region representing the predetermined distance from the button region.

For example, in an example shown in the first exemplary embodiment, in the recording and playback apparatus, a user interface image includes button region 112 in movable region 121. When virtual coordinates of pointer 111 are present within a predetermined distance from button region 112 (i.e., virtual coordinates of pointer 111 are present at a position in region 141 provided outside button region 112), UI creating circuit 36 displays pointer 111 at a position in button region 112 closest to the virtual coordinates.

By this, in case where the user operates main body apparatus 1 by displaying a motion menu on display 4 and moving pointer 111 on the motion menu by shaking remote controller 2 up and down or left and right, in an electronic device such as a recording and playback apparatus, after pointer 111 has been disposed on button region 112 once, pointer 111 can be made less likely to be shifted from button region 112. In addition, it becomes easier for the user to dispose pointer 111 on button region 112 displayed on display 4.

The main body apparatus may be a recording and playback apparatus that records and plays back a plurality of broadcast programs.

For example, in an example shown in the first exemplary embodiment, main body apparatus 1 is a recording and playback apparatus that records and plays back a plurality of broadcast programs. By this, the user can operate the recording and playback apparatus by shaking remote controller 2 up and down or left and right, and thus can intuitively operate the recording and playback apparatus.

Other Exemplary Embodiment

As described above, as exemplification of a technique disclosed in the present application, the first exemplary embodiment is described. However, the technique in the present disclosure is not limited thereto and can also be applied to an exemplary embodiment where changes, substitutions, additions, omissions, etc., are made. In addition, it is also possible to make a new exemplary embodiment by combining the components described in the above-described exemplary embodiment.

Hence, other exemplary embodiments will be exemplified below.

Although in FIGS. 6 to 8 each of a user interface image, a movable region, and a clip region is rectangular, the present disclosure is not limited to this configuration in any way. They may have any other shape.

FIGS. 6 to 8 describe a case in which UI creating circuit 36 creates a motion menu for a first program selection menu for a channel recording list, and presents the motion menu to a user. However, the motion menu is not limited to the first program selection menu for a channel recording list. UI creating circuit 36 may create a motion menu for a first program selection menu and a second program selection menu for each of a channel recording list, a normal recording list, and a category list.

The first exemplary embodiment describes main body apparatus 1 and remote controller 2 of a recording and playback apparatus. However, the present disclosure is not limited to a recording and playback apparatus. The present disclosure is applicable to any other electronic device including a user interface creator that creates a user interface image including a pointer having a position that changes based on an amount of change in posture of a remote controller. For example, a television receiver including a display that displays images or a projector may include the above-described user interface creator.

In the first exemplary embodiment, normal recording circuit 14, channel recording circuit 27, control circuit 31, program DB creating circuit 34, program playback circuit 35, UI creating circuit 36, and screen superimposing circuit 37 are shown as individual blocks. However, the present disclosure is not limited to this configuration. A part or all of these blocks may be configured as a single block. In addition, these blocks may be implemented by hardware, or may be implemented by a combination of software that is created to perform these functions and a processor.

The present disclosure is not limited to a remote control system including a main body apparatus and a remote controller. The present disclosure is applicable to any electronic device including a UI creating circuit that creates a user interface image including a pointer having a position that changes based on an input signal. In another exemplary embodiment, there is provided an electronic device including a UI creating circuit that creates a user interface image including a pointer having a position that changes based on an input signal.

The input signal is not limited to a control signal that is transmitted from the remote controller and that includes an amount of change in posture of the remote controller. The input signal may be arbitrary signal indicating a changing position.

The UI creating circuit determines, based on the input signal, virtual coordinates of a pointer in a virtual plane including a user interface image. When the virtual coordinates of the pointer are present in a smaller movable region than the user interface image in the virtual plane, the UI creating circuit displays the pointer at a position of the virtual coordinates. When the virtual coordinates of the pointer are present outside the movable region in the virtual plane, the UI creating circuit displays the pointer at a position in the movable region closest to the virtual coordinates. When the virtual coordinates of the pointer are present in a clip region which is a larger region than the movable region, and have reached a boundary between the clip region and an outside of the clip region in the virtual plane, the UI creating circuit limits the virtual coordinates within the clip region.

By this, a user can intuitively operate electronic device including the UI creating circuit that creates a user interface image including a pointer having a position that changes based on an input signal.

As described above, the exemplary embodiments are described as exemplification of the technique in the present disclosure. To do so, the accompanying drawings and detailed description are provided.

Therefore, the components described in the accompanying drawings and detailed description not only include components essential to solve the problems, but also include, in order to exemplify the above-described technique, components that are not essential to solve the problems. Hence, it should not be acknowledged such that describing those non-essential components in the accompanying drawings or detailed description directly means that those non-essential components are essential.

In addition, the above-described exemplary embodiments are to exemplify the technique in the present disclosure, and thus, various changes, substitutions, additions, omissions, etc., can be made within the range of the claims or the range of equivalency of the claims.

INDUSTRIAL APPLICABILITY

The present disclosure is applicable to an electronic device that presents a user with a user interface image including a pointer that moves according to motion of a remote controller. Specifically, the present disclosure is applicable to a television receiver, a recording and playback apparatus, etc.

REFERENCE MARKS IN THE DRAWINGS

1: main body apparatus
2: remote controller
3: program information server apparatus
4: display
10: normal recorder
11, 12, 13, 21, 22, 23, 24, 25, 26: tuner
14: normal recording circuit
15: storage apparatus
20: channel recorder
27: channel recording circuit
28: storage apparatus
31: control circuit
32: Bluetooth transmitter-receiver
33: communication circuit
34: program DB creating circuit
35: program playback circuit
36: UI creating circuit
37: screen superimposing circuit
40: screen
51: coordinate computation circuit
52: register
53: coordinate correction circuit
54: menu creating circuit
55: pointer creating circuit
56: UI combining circuit
61: control circuit
62: Bluetooth transmitter-receiver
63: motion sensor
64: motion key
65: other keys
71: cursor key
72: OK key
73: channel recording list key
74: normal recording list key
75: category list key
76: playback menu key
101: program table area
102: description area
103: cursor
112, 113, 114, 115, 116, 117: button region
111: pointer
111a, 111b, 111c: position
121: movable region
122: clip region
131: clip section
141: region
ANT: antenna

The invention claimed is:

1. A remote control system comprising: a main body apparatus; and a remote controller,
wherein the remote controller includes:
a motion sensor that detects an amount of change in posture of the remote controller; and
a transmitter that transmits a control signal including the amount of change in posture to the main body apparatus,
wherein the main body apparatus includes:
a receiver that receives the control signal transmitted from the remote controller;
a user interface creator that creates a user interface image including a pointer having a position that changes based on the amount of change in posture; and
a controller that controls operation of the main body apparatus, according to the control signal, and
wherein the user interface creator:
determines virtual coordinates of the pointer in a virtual plane including the user interface image, based on the amount of change in posture;
when the virtual coordinates of the pointer are present in a movable region in the virtual plane, displays the pointer at a position of the virtual coordinates, the movable region being a smaller region than the user interface image;

when the virtual coordinates of the pointer are present outside the movable region in the virtual plane, displays the pointer at a position in the movable region closest to the virtual coordinates; and when the virtual coordinates of the pointer have reached a boundary of a clip region in the virtual plane, limits the virtual coordinates within the clip region, the clip region being a larger region than the movable region.

2. The remote control system according to claim 1, wherein initial values of the virtual coordinates of the pointer are coordinates of a center of the movable region.

3. The remote control system according to claim 1, wherein the user interface image includes at least one button region present in the movable region and in contact with a boundary of the movable region.

4. The remote control system according to claim 1, wherein the user interface image includes at least one button region present in the movable region and having a predetermined distance from a boundary of the movable region, and a part of a boundary of the button region is a clip section, and wherein when the virtual coordinates of the pointer have moved from a position in the button region and reached the clip section, the user interface creator limits the virtual coordinates within the button region.

5. The remote control system according to claim 1, wherein the user interface image includes, in the movable region, at least one button region, and wherein when the virtual coordinates of the pointer are present within a predetermined distance from the button region, the user interface creator displays the pointer at a position in the button region closest to the virtual coordinates.

6. The remote control system according to claim 1, wherein the main body apparatus is a recording and playback apparatus that records and plays back a plurality of broadcast programs.

7. An electronic device comprising:
the remote control system according to claim 1; and
a display that displays an image.

8. An electronic device comprising:
the remote control system according to claim 1; and
a recording and playback unit that records and plays back a plurality of broadcast programs.

\* \* \* \* \*